United States Patent [19]
McKay

[11] 3,887,251
[45] June 3, 1975

[54] TRACTOR AND TRAILER FIFTH WHEEL BEARING ATTACHMENT

[76] Inventor: Roy H. McKay, 6305 Mahoning Ave., Youngstown, Ohio 44515

[22] Filed: Aug. 6, 1974

[21] Appl. No.: 495,252

[52] U.S. Cl. .................................. 308/136; 280/433
[51] Int. Cl. ............................................ B62d 53/08
[58] Field of Search ............ 308/136, 221; 280/433

[56] References Cited
UNITED STATES PATENTS

| 2,219,415 | 10/1940 | Fontaine | 280/433 UX |
| 2,503,530 | 4/1950 | Weber | 308/221 |
| 2,662,799 | 12/1953 | Schaefer | 308/136 |
| 3,096,099 | 7/1963 | Bowles | 308/136 X |

*Primary Examiner*—Leo Friaglia
*Attorney, Agent, or Firm*—Gardner J. O'Boyle; James G. O'Boyle

[57] ABSTRACT

A preassembled bearing element including lubricated plates attachable directly to the trailer plates of existing fifth wheel rigs.

6 Claims, 4 Drawing Figures

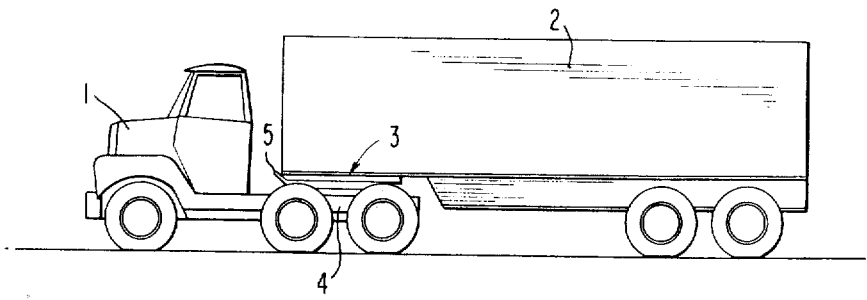
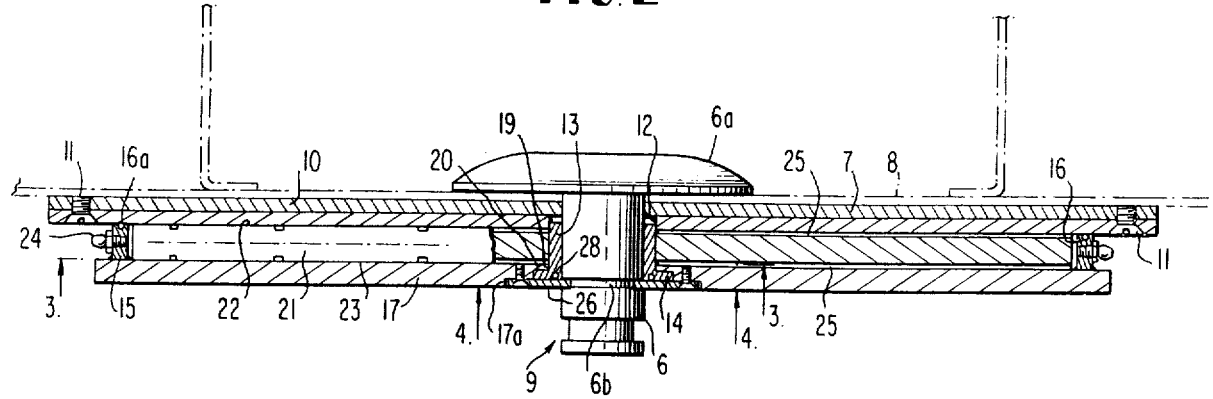
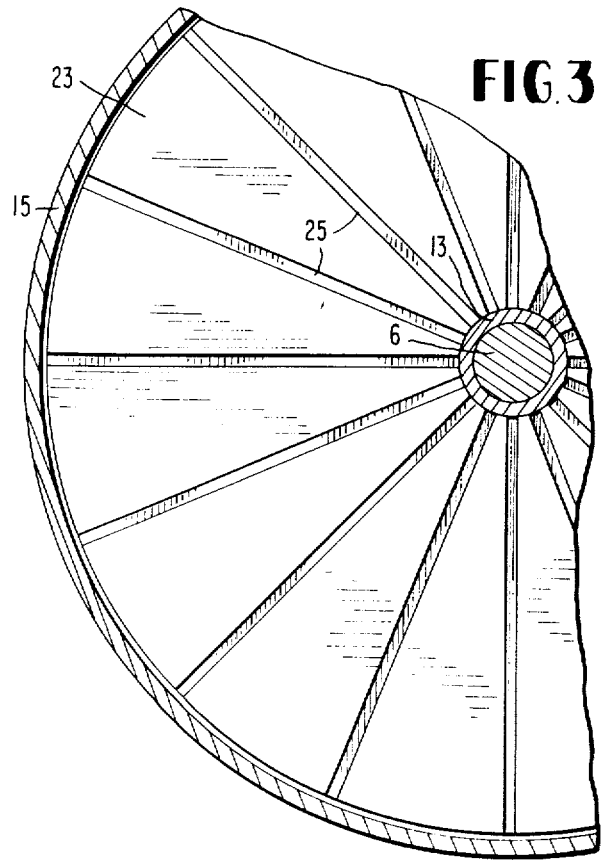
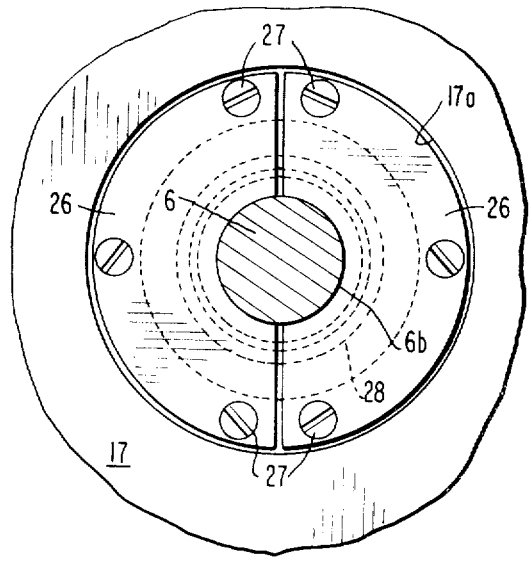

TRACTOR AND TRAILER FIFTH WHEEL BEARING ATTACHMENT

BACKGROUND OF THE INVENTION

Fifth wheels generally comprise a pivoted and rearwardly slotted plate mounted on the rear of a tractor unit, and engageable with a fixed plate mounted on the bottom of a trailer body, adjacent the front thereof. The trailer plate incorporates a depending king pin which is received in a slot of the tractor plate, the latter incorporating means for automatically locking the king pin in place when the tractor is backed into position with its fifth wheel cooperatively engaged by and with the trailer plate.

The plate members of fifth wheels have relatively large mutual bearing surfaces which require careful and constant lubrication with heavy grease. Owing to the great pressures exerted on the plates, particularly in heavily loaded rigs, the lubricant may be squeezed out of place, so that the plates grab instead of sliding smoothly over one another. In cold weather, the lubricant may stiffen, and even harden, rendering it practically useless. When there is improper or non-functioning lubrication of the fifth wheel plates, depending on the weather, effective load, etc., the following operating troubles may develop: (1) sliding on ice; (2) whipping, particularly with four-wheelers; (3) locking of the plates; (4) loss of maneuverability of turning; and (5) wetting of the plates.

It has been found that the above-recited, and other operating disadvantages, normally attendant upon the use of conventional fifth wheel rigs, may be eliminated by providing such rigs with a specially designed bearing element. It has also been found that the novel bearing element can be assembled into a preformed unit or assembly, and that the latter can be attached directly to the trailer plates of existing fifth wheel rigs without requiring any alteration whatever of such rigs.

With the improvements of the present invention a substantially frictionless coupling is effected between the plates of a fifth wheel assembly, no matter what type of vehicle is involved, and the maneuverability of the vehicle is increased to a maximum, even under the most difficult operating conditions. In addition, sliding on ice is prevented, as is locking and whipping, and drying out of plates is no longer necessary.

DESCRIPTION OF THE DRAWINGS

FIG. 1 is a side elevational view of a tractor-trailer rig upon which the fifth wheel bearing attachment of the present invention is adapted to be used;

FIG. 2 is a sectional view of the bearing attachment of the present invention connected to a fixed plate mounted on the bottom of the trailer body;

FIG. 3 is a view taken along line 3—3 of FIG. 2; and

FIG. 4 is a view taken along line 4—4 of FIG. 2.

Referring to the drawings, and more particularly to FIGS. 1 and 2, there is shown a tractor 1 coupled to a semitrailer 2 by a fifth wheel unit designated generally by the numeral 3. The chassis 4 of tractor 1 mounts a conventional lower fifth wheel plate 5 which includes a slot for receiving a depending king pin 6 extending through the upper fifth wheel plate 7 and having a head portion 6a welded to the bottom 8 of the trailer.

As will be seen in FIGS. 2, 3 and 4, the fifth wheel bearing attachment of the present invention, designated generally by numeral 9 is shown attached to the trailer plate 7. The attachment 9 comprises a top plate 10, of armor plate, or other suitable wear and abrasion resisting metal. The plate 10 is coextensive with the trailer plate 7 and is detachably secured thereto by machine screws 11. The plate 10 is also provided with a central aperture 12 which receives the upper end of bushing 13 having an inverted bottom flange 14. A ring 15 having a groove 16 on the upper edge thereof, for receiving a packing ring 16a, is welded to the upper surface of a bottom plate 17 as indicated at 18.

The bottom plate 17 consists of armor plate, or other suitable wear, abrasion and shock-resistant material, and is centrally apertured as indicated at 19, to fit over the bushing 13. The lower edge of aperture 19 is routed out to form a shoulder 20 which has bearing engagement on the inner surface of bottom flange 14 of bushing 13. The bottom surface of plate 17 will have direct, face-to-face bearing engagement on fifth wheel tractor plate 5, as will be described more fully hereinafter. It will be seen that plate 17 is freely rotatable about the bushing 13. To insure as complete an anti-friction mounting of the assembly as possible, the adjacent faces of plates 10 and 17 are engaged and spaced apart by a bearing plate 21 centrally apertured, as shown, to fit over the bushing 13. The upper and lower faces 22, 23 of plate 21 are directly opposed the steel bearing plates 10 and 17 in load-bearing relation thereto and therebetween. To improve the anti-friction action of the member 21, the interior of the casing formed by plates 10 and 17 is charged with suitable lubricating grease, or oil, introduced under pressure, through fittings 24 tapped into ring 15, the level of the lubricant being shown by the dotted line in FIG. 2. To insure uniform distribution of the lubricant on and over the bearing surfaces 22, 23 of bearing plate 21, these surfaces are severally formed with a plurality of radial grooves 25. It will be seen that when grease guns charge grease through fittings 24 into the casing, the grease will be caused to flow, under pressure, along radial grooves 25, whereby both surfaces of anti-friction member 21 and the severally opposed bearing surfaces of steel plates 10 and 18 are uniformly and positively lubricated. Any suitable number of grease gun fittings 24 may be employed, and the casing can be internally lubricated, at will, without being dismantled, or disturbing the fifth wheel assembly, even when a trailer is operatively coupled to a tractor.

In order to maintain the bushing 13 in operative position on the stub shaft, the lower surface of plate 17 is provided with a circular recess 17a for receiving both halves of a split washer 26 which support the bushing flange 14. The washer is secured to the plate 17 by screws 27, and the inner peripheral edge of the washer is received within a groove 6b formed in the surface of the king pin 6. An O-ring 28 is provided between the upper surface of the split washer and the lower surface of the flange 14 to prevent leakage of the lubricating fluid through the bushing assembly.

It will be seen that when the tractor plate 5 of the fifth wheel assembly is frictionally engaged with bottom bearing plate 17, and the tractor plate is rotatably locked in place on the king pin 6, the tractor plate and the bearing plate 17 will substantially function as an entity, whereby the load is carried by peripheral ring 15 and floating plate 21 thus providing a minimum of frictional rubbing between the lower fifth wheel plate 5 and the upper fifth wheel plate 7.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a fifth wheel assembly including an upper trailer plate mounting a king pin and a lower slotted tractor plate adapted for locking engagement with said king pin, the improvement comprising an anti-friction device between said fifth wheel plates, said device comprising a bushing journaled on the king pin, a first bearing plate detachably secured to the upper trailer plate, said first bearing plate being centrally apertured for receiving the upper end portion of said bushing, a flange at the bottom of said bushing, a second bearing plate mounted for rotation on said flanged bushing, a split washer connected to the second bearing plate and engaging the flange of the bushing for holding the bushing in operative position on said king pin, said second bearing plate being frictionally engageable with and by said tractor plate and rotatable therewith, and a third plate positioned between said first and second bearing plates and mounted for free rotation about the bushing, said third plate incorporating lubricating means on both surfaces to substantially eliminate friction between said first and second bearing plates.

2. An anti-friction device according to claim 1, wherein a ring member is positioned between the first and second bearing plates and encircling the third plate, said ring member being fixedly attached to the second bearing plate and having free sliding contact with the first bearing plate.

3. An anti-friction device according to claim 2, wherein the lubricating means comprises a plurality of radial grooves formed on the upper and lower surfaces of the third plate, and means for introducing lubricant into said grooves.

4. An anti-friction device according to claim 3, wherein the means for introducing lubricant into said grooves comprises grease fittings connected to said ring member.

5. An anti-friction device according to claim 3, wherein a sealing ring is interposed the ring member and the first bearing plate to prevent leakage of lubricant in the vicinity of the ring member and the first bearing plate.

6. An anti-friction device according to claim 1, wherein an O-ring is mounted between the split washer and the bushing flange to prevent leakage of lubricant in the vicinity of the king pin.

* * * * *